No. 864,104. PATENTED AUG. 20, 1907.
P. L. O'TOOLE.
MOLDING MACHINE.
APPLICATION FILED AUG. 15, 1906.

5 SHEETS—SHEET 1.

Witnesses
Geo Ackman Jr.
C. C. Hines.

Inventor
P. L. O'Toole,
By Victor J. Evans
Attorney

No. 864,104. PATENTED AUG. 20, 1907.
P. L. O'TOOLE.
MOLDING MACHINE.
APPLICATION FILED AUG. 15, 1906.

5 SHEETS—SHEET 2.

No. 864,104. PATENTED AUG. 20, 1907.
P. L. O'TOOLE.
MOLDING MACHINE.
APPLICATION FILED AUG. 15, 1906.

5 SHEETS—SHEET 4.

Witnesses
Geo. Hickman
C. C. Hines

Inventor
P. L. O'Toole,
By Victor J. Evans
Attorney

No. 864,104. PATENTED AUG. 20, 1907.
P. L. O'TOOLE.
MOLDING MACHINE.
APPLICATION FILED AUG. 15, 1906.

5 SHEETS—SHEET 5.

Witnesses
Geo. Ackman Jr.
Elizabeth Fague

Inventor
P. L. O'Toole
By Victor J. Evans.
Attorney

UNITED STATES PATENT OFFICE.

PATRICK L. O'TOOLE, OF EDWARDSVILLE, ILLINOIS.

MOLDING-MACHINE.

No. 864,104.  Specification of Letters Patent.  Patented Aug. 20, 1907.

Application filed August 15, 1906. Serial No. 330,745.

*To all whom it may concern:*

Be it known that I, PATRICK L. O'TOOLE, a citizen of the United States of America, residing at Edwardsville, in the county of Madison and State of Illinois, have invented new and useful Improvements in Molding-Machines, of which the following is a specification.

This invention relates to a molding machine for the production of articles from plastic materials, and may be employed in the manufacture of candy, briquets, concrete bricks and blocks, soap, popcorn blocks, and other articles generally formed from plastic materials or compositions of various kinds.

The object of the invention is to provide a machine of this character which is simple of construction, durable and efficient in use, comparatively inexpensive of production, and adapted to form a maximum number of articles in a given period of time.

With the above and other objects in view, the invention consists of the novel construction, combination and arrangement of parts hereinafter fully described and claimed, reference being had to the accompanying drawings, in which:—

Figure 1:
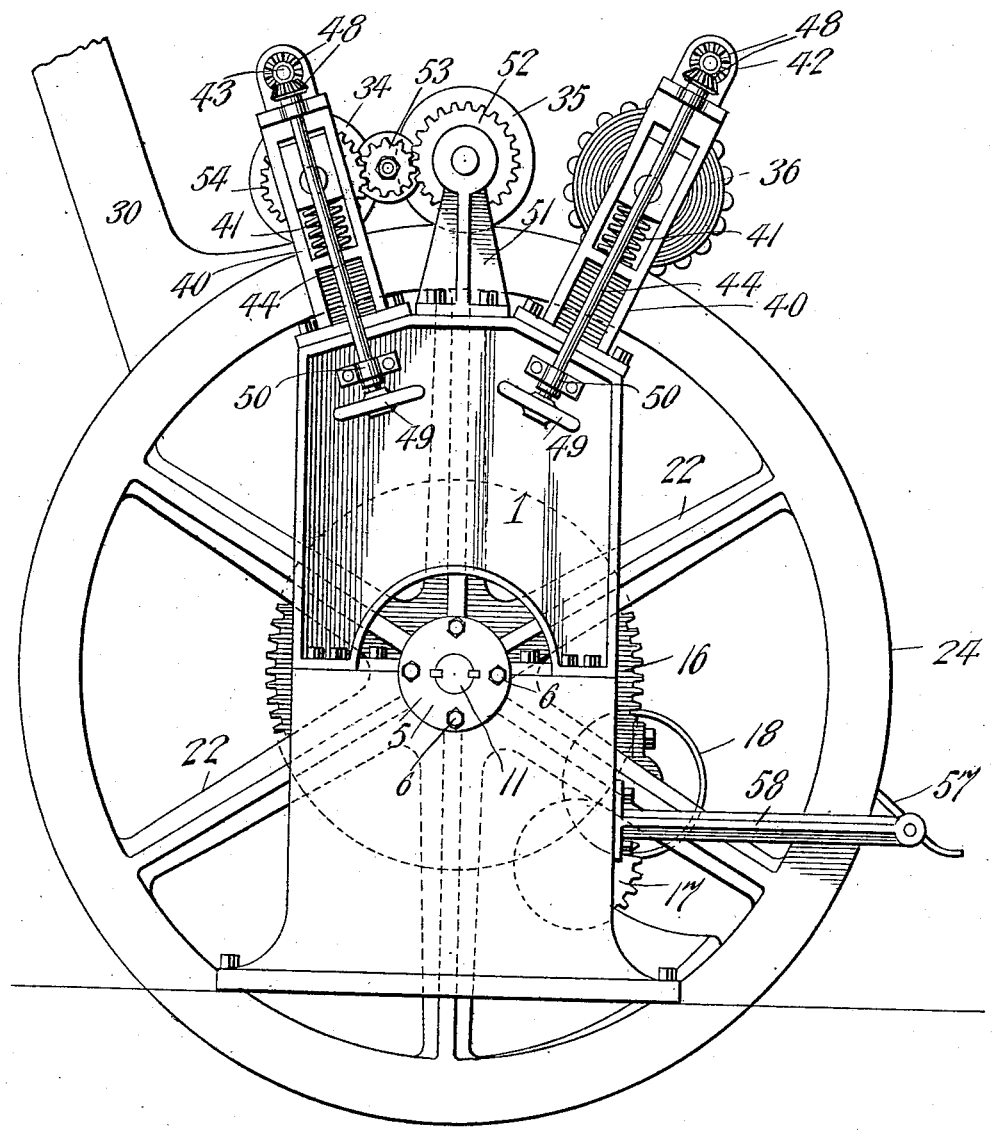
Figure 2:
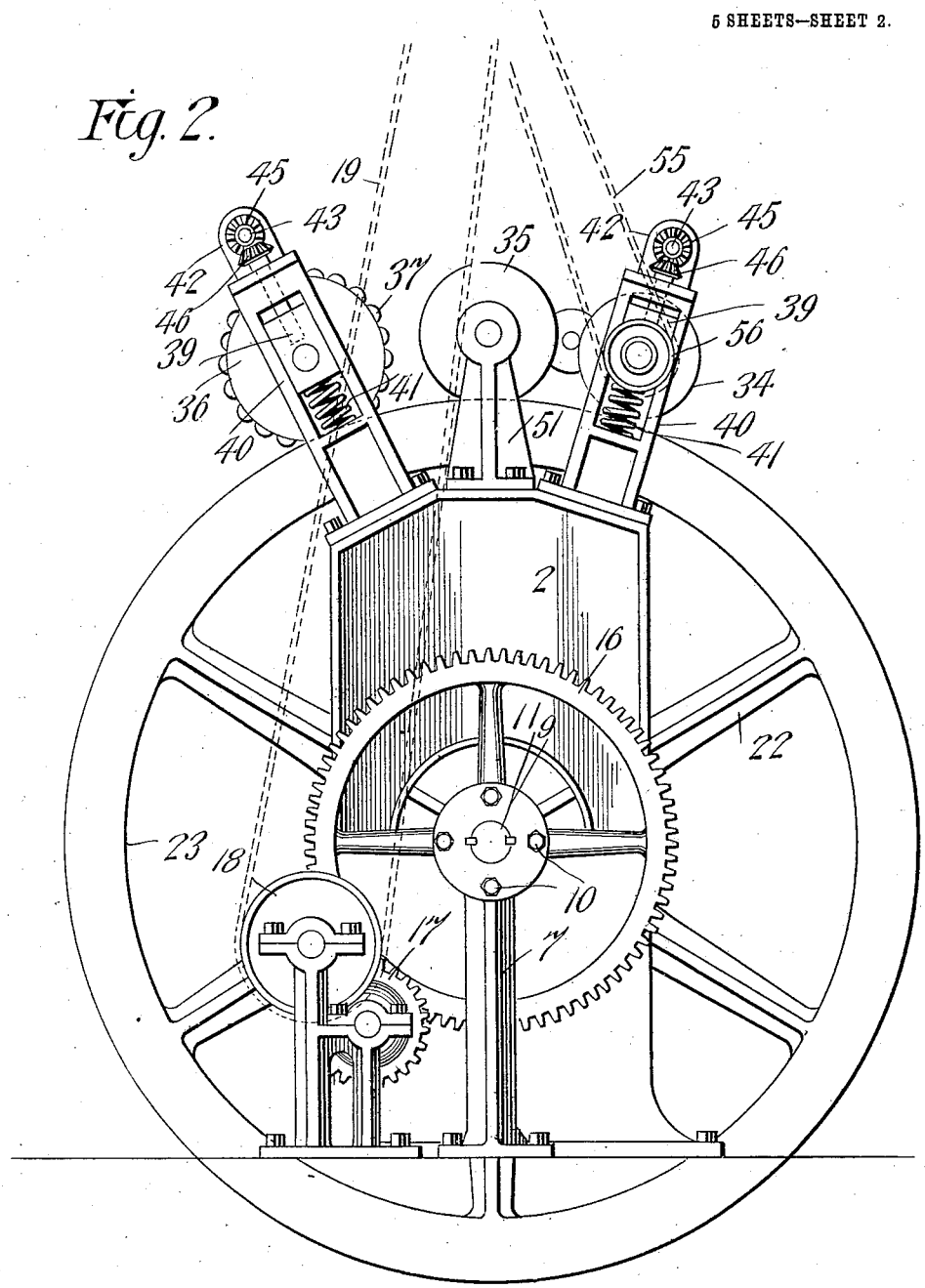
Figure 3:
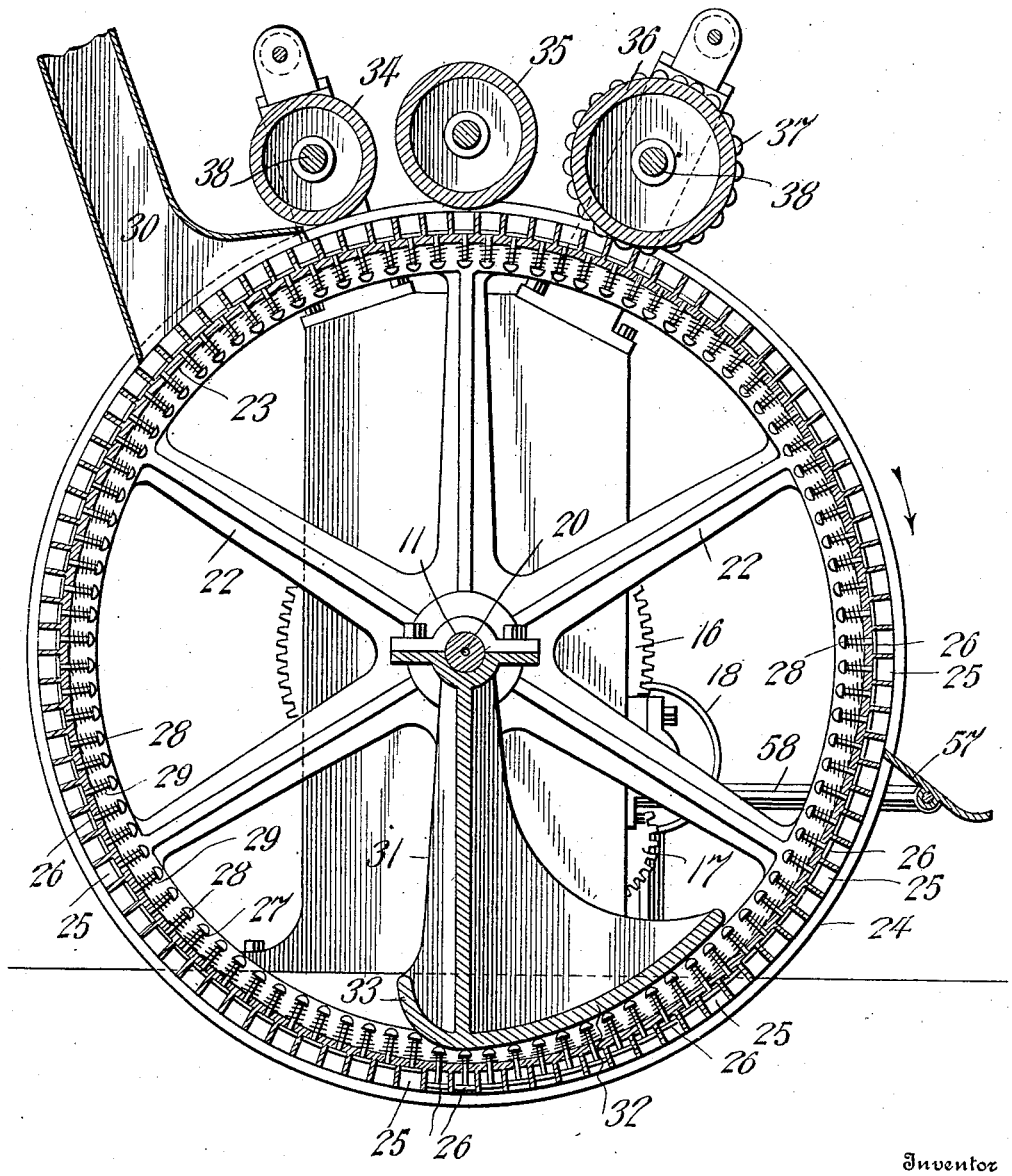
Figure 4:
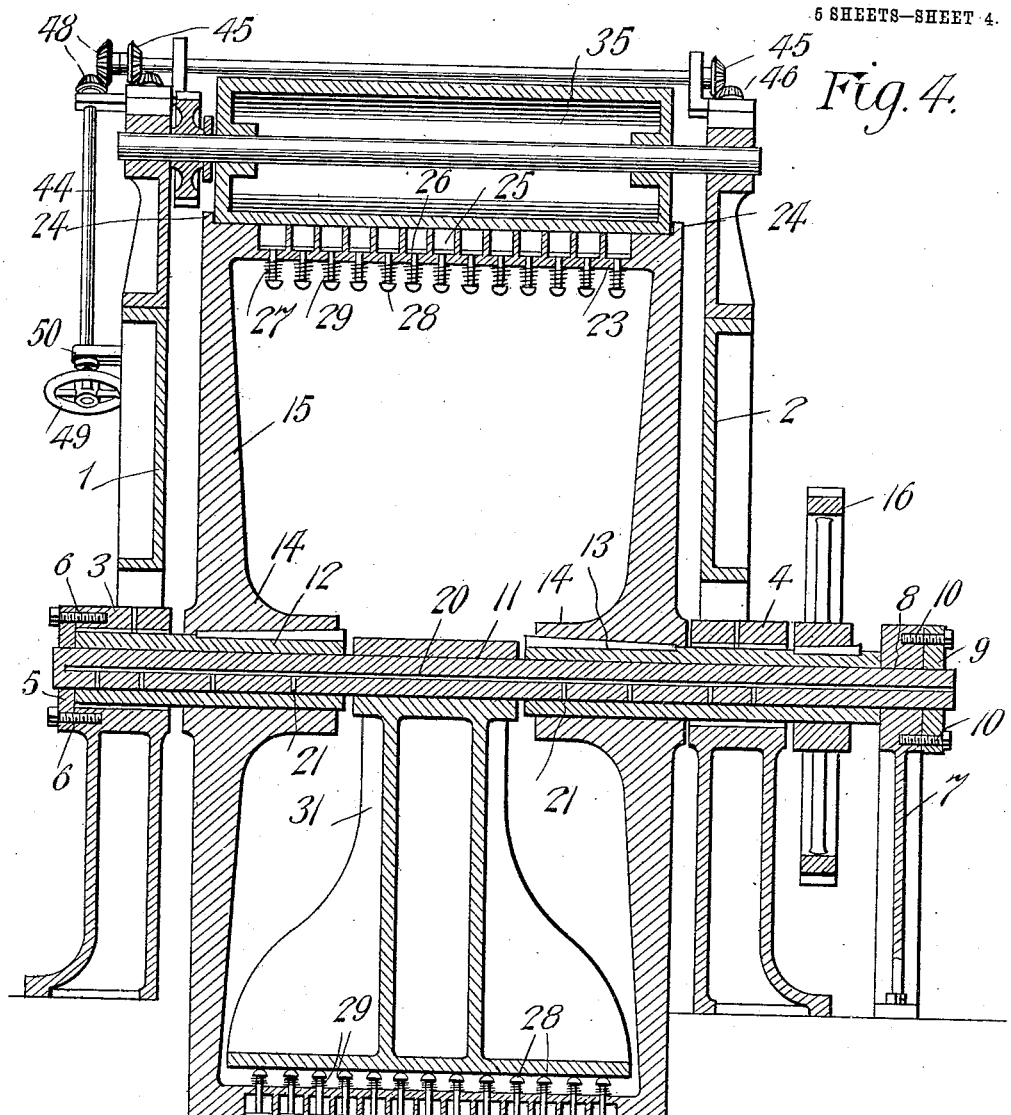
Figure 5:
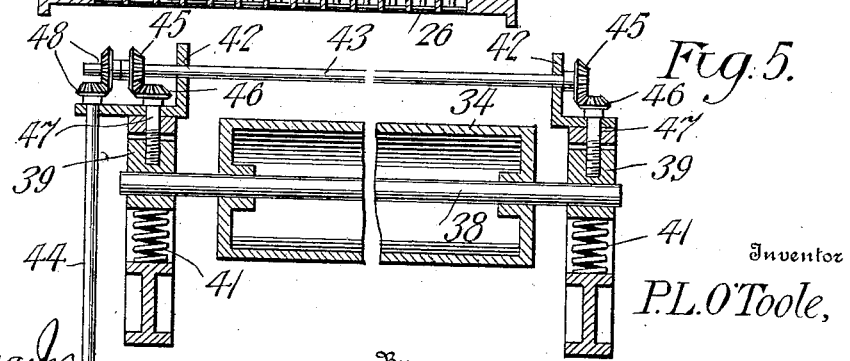
Figure 6:
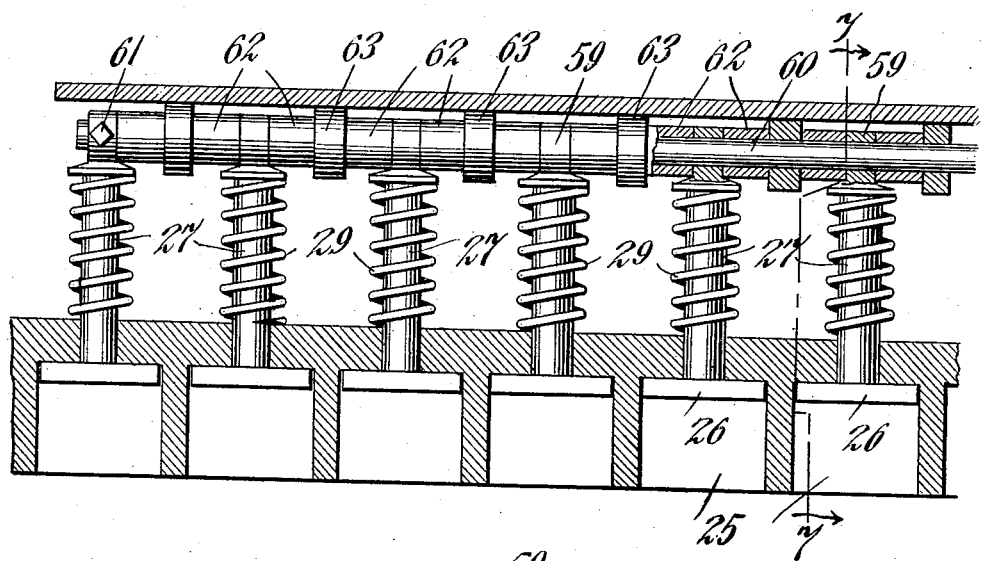
Figure 7:
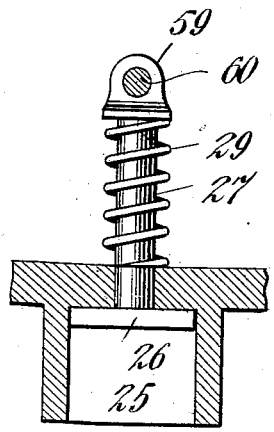

Figure 1 is a side elevation of a molding machine embodying my invention. Fig. 2 is an opposite side elevation thereof. Fig. 3 is a vertical front to rear section taken centrally through the machine. Fig. 4 is a central vertical transverse section. Fig. 5 is a section through one of the compression rollers and its bearings. Fig. 6 is a detail section showing a modification in the construction of the expressing means. Fig. 7 is a section on line 7—7 of Fig. 6, showing one of the mold boxes and the coöperating expressing plunger.

The frame of the machine comprises a pair of side standards 1 and 2, which may be bolted to the floor or otherwise secured in position. These standards are provided with bearings 3 and 4, the outer end of the bearing 3 being closed by a cap-plate 5 secured thereto by screws or other suitable fastenings 6. Arranged adjacent the standard 2 is a supplementary standard 7 formed with a receiving opening 8 and to which is applied a plate 9 similar in form to the plate 5 and fastened thereto by screws 10. A stationary shaft or axle 11 is supported and held rigidly from rotation by the plates 5 and 9 and extends through the bearings 3 and 4 and the opening 8 in standard 7. Journaled in the bearings 3 and 4 and rotating on the stationary axle 11 are spaced hollow shafts 12 and 13, to which are keyed the hubs 14 of a hollow mold wheel or drum 15. The shaft 13 extends beyond the bearing 4 and has keyed thereto a spur gear 16 connected by a train of gears 17 with a drive pulley 18, from which a belt 19 may lead to an overhead drive shaft, such gearing serving to communicate motion to the mold wheel. It will, of course, be understood that the ordinary fast and loose pulley and belt shifting mechanism may be employed to enable the mold wheel or drum to be driven or brought to a state of rest when desired without starting or stopping the line or drive shaft. The axle 11 is preferably provided with a longitudinal bore 20 for the reception of a lubricant, which feeds from said bore through outlets 21 to properly lubricate the contacting surfaces of said axle and the hollow shafts, while the bearings 3 and 4 may be provided with any type of lubricating means for a proper lubrication of the journals of the axles.

The mold wheel or drum 15 is provided with spokes 22 radiating from the respective hubs 14 and carrying an anular rim plate 23 forming the periphery of the drum, said plate being provided with flanges 24 to form an intervening groove. Between the flanges the rim plate or periphery 23 is annularly and transversely partitioned to provide transverse rows of mold cavities, chambers or boxes 25 extending continuously around the drum, said boxes being closed at their inner ends and communicating at their outer or open ends with the surrounding groove. In each of the boxes is disposed an expelling plunger 26 having an inwardly extending stem 27 slidable in an opening in the rim 23 and provided at its inner end with a contact head 28. A spring 29 surrounds the stem between the head and inner side of the rim and normally exerts its expansive energy to hold the plunger seated against the inner or bottom wall of the mold box, the plunger thus constituting an inner forming surface. The plastic material from which the articles are to be produced is supplied to the mold boxes through a hopper or chute 30 extending at its lower end into the grooved periphery of the drum at a point slightly in rear of the highest point of rotation of the drum. The mold boxes may be of any desired form and size for the production of articles of different sizes and shapes, and if desired the plungers may bear the trade-mark of the manufacturer or any other matter to be impressed in or embossed upon the goods. Keyed to the stationary axle 11 between the hubs 14 of the drum is a hanger 31 which carries at its lower end a cam shoe 32, said shoe being in the form of a plate curved eccentrically to the arc of the periphery of the drum and provided with an up-turned rear end 33. The function of this shoe is to force the plungers outward to expel the completed articles formed in the mold boxes, as hereinafter described.

The plastic material supplied to the mold boxes is compressed therein to the desired density or compactness by a series of compression rollers 34, 35 and 36, arranged and operating to gradually and progressively force the material with increased pressure into the boxes. The roller 34 is disposed adjacent the hopper or chute 30 and forces the material under a slight degree of pressure into the boxes. The secondary roller 35 is arranged between the rollers 34 and 36 and projects into the groove of the drum to force the material further and with increased pressure into the boxes, while the tertiary roller 36 projects a little further into the grooved periphery and packs the material to the desired degree in the boxes, thus completing the compressing operation.

If desired, the periphery of the roller 36 may be provided with any suitable type of packing, shaping or ornamenting projections 37 to impart any type of contour to the outer surface of the article. The rollers 34 and 36 are mounted in a similar manner, each having its shaft 38 journaled in bearings 39 arranged to slide in slotted bearing brackets 40 fixed to the standards 1 and 2, the bearings 39 being supported upon coiled springs 41 which urge them upward so as to adjust the roller away from the periphery of the drum. The standards 40 carry angular bearing members 42 in which are journaled shafts 43 and 44. The shaft 43 carries beveled pinions 45 meshing with pinions 46 on the upper ends of adjusting screws 37 which operatively engage or work in threaded sockets formed in the bearings 39, so that by adjusting said screws in one direction or the other the bearings may be forced downward against the resistance of the springs 41 or drawn upward to adjust the roller toward or from the periphery of the mold drum, whereby the pressure of the roller on the plastic material may be regulated. The shaft 44 is connected with the shaft 43 through intermeshing beveled gears 48 and is provided at its lower end, which is journaled in a suitable bearing 50, with a hand wheel or equivalent operating device 49 by which said shaft may be operated to turn the shaft 43 for the adjustment of the screws. The shaft of the intermediate roll 35 turns in stationary bearings on brackets 51 and carries a gear 52 connected by an idler gear 53 with a gear 54 on the shaft of the roll 34, whereby the roll 34 may be positively driven from the roll 35, the latter receiving its motion from the drive shaft through a belt 55 and pulley 56. The rollers 34 and 35 accordingly are positively driven independently of the mold drum to compress the material into the mold boxes, while the roll 36 is rotated by the engagement of its projection 37 with the walls of the mold boxes.

In order to keep the periphery of the wheel clear from particles of the plastic composition and remove any excess material from the mold boxes, a scraper 57 is provided to act upon the descending side of the periphery of the wheel between the final compression roller 36 and expressing shoe 32. The said scraper 57 is carried by supporting arms 58 secured to the frame standards and is inclined at a suitable angle to form a shelf down which the removed particles of material may slide and discharge by gravity on to the floor or into a suitable receptacle.

If desired, the scraper may be pivoted so that it may be swung out of engagement with the drum when its use is not required.

In operation, the material feeding from the hopper 30 enters the underlying mold boxes and portion of the grooved periphery of the drum, which rotates in the direction of the arrow shown in Fig. 2, such material being progressively forced into the boxes by the action of the rollers 34, 35 and 36, the density of compression being regulated by the adjustment of the rollers 34 and 36 in the manner before described. As the filled mold boxes near the lowest point in the path of revolution of the drum the heads of the stems of the expressing plungers come in contact with the shoe 32 and are gradually forced outwardly to cause the plungers to expel the completed articles, the mode of operation being fully illustrated in Fig. 3. The formed articles may drop from the mold boxes into a receiving tank of water in which they are cooled or upon a belt or other conveyer for transmission to a desired point of deposit.

It will be seen that the construction of the machine is such as to secure the formation of the articles in a rapid manner, so that a large number of articles may be produced within a given period of time.

As shown in Fig. 6, the stems 27 of each transverse row of expressing plungers may be provided at their outer ends with bearing eyes 59 for the passage of the stationary transverse rod or axle 60 detachably connected with the eyes of the terminal stems by suitable fastenings 61. Revolubly mounted on this shaft or axle between the stems are sleeves 62 carrying roller enlargements 63 adapted to run in contact with the face of the cam shoe 32 to reduce friction during the expressing operation. After removing the rod the sleeves may be detached for the convenient substitution of new sleeves for those which have become worn to an appreciable extent.

Having thus described the invention, what is claimed as new, is:—

1. In a molding apparatus, the combination of a rotary mold drum provided with peripheral mold boxes, a hopper for supplying the plastic material thereto, said hopper being arranged at one point in the path of revolution of the drum, a series of compression rolls arranged in regular order in close relation to the hopper to gradually and increasingly compress the material into the mold boxes, one of said rolls being driven by engagement with the drum, and means for positively driving the other rolls independently of the drum.

2. In a molding apparatus, the combination of a rotary mold drum provided with peripheral mold boxes, a hopper for supplying the plastic material thereto, a series of three compression rolls arranged adjacent to the hopper and operating in sequence to force the material by gradual compression into the boxes, the intermediate roll being fixed with relation to the boxes and the primary and tertiary rolls adjustable toward and from the same, the tertiary roll being driven by engagement with the drum, means for adjusting the primary and tertiary rolls, and means for driving the primary and secondary rolls independent of the drum.

3. In a molding apparatus, the combination with a rotary mold drum provided with peripheral mold boxes, of a hopper for supplying the plastic material thereto, a compression roll arranged adjacent the hopper, spring-supported adjustable bearings therefor, adjusting screws engaging said bearings and provided with gears, a shaft having gears intermeshing therewith, and means for operating said shaft for adjusting the screws for shifting the position of the bearings to adjust the roll toward and from the boxes.

4. In a molding apparatus, the combination with a rotary mold drum provided with peripheral mold boxes, of a hopper for supplying the plastic material thereto, a series of three compression rolls arranged adjacent the hopper and operating in sequence to force the material by gradual compression into the boxes, the intermediate roll being fixed in relation to the boxes and the tertiary roll driven by engagement with the drum, spring-supported adjustable bearings for the primary and tertiary rolls, adjusting screws engaging said bearings and provided with gears, shafts having gears meshing with the gears of the said adjusting screws, means for operating the said shafts to operate the screws for adjusting the bearings of said primary and tertiary rolls, and means for driving the primary and tertiary rolls.

5. In a molding apparatus, the combination of a frame embodying spaced supporting standards provided with bearings, a stationary axle, spaced hollow shafts journaled on the axle and in said bearings, a rotary mold wheel or drum having spaced hubs fixed to and revoluble with said shafts and provided with a rim formed with an annular series of mold boxes, means for supplying and compressing the material in said boxes, expelling plungers operating in the boxes, and a cam shoe fixed to the stationary axle between the revoluble shafts and arranged to engage and project the plungers.

In testimony whereof, I affix my signature in presence of two witnesses.

PATRICK L. O'TOOLE.

Witnesses:
 CHARLES E. GUELLIG,
 JOHN HOLLAREN.